Dec. 17, 1929.  S. B. RAYZOR  1,739,917
COMBINATION VEHICLE SPRING AND SNUBBER
Filed Aug. 24, 1926   2 Sheets-Sheet 1

Samuel B. Rayzor, Inventor

By Hardway & Cathey
Attorneys

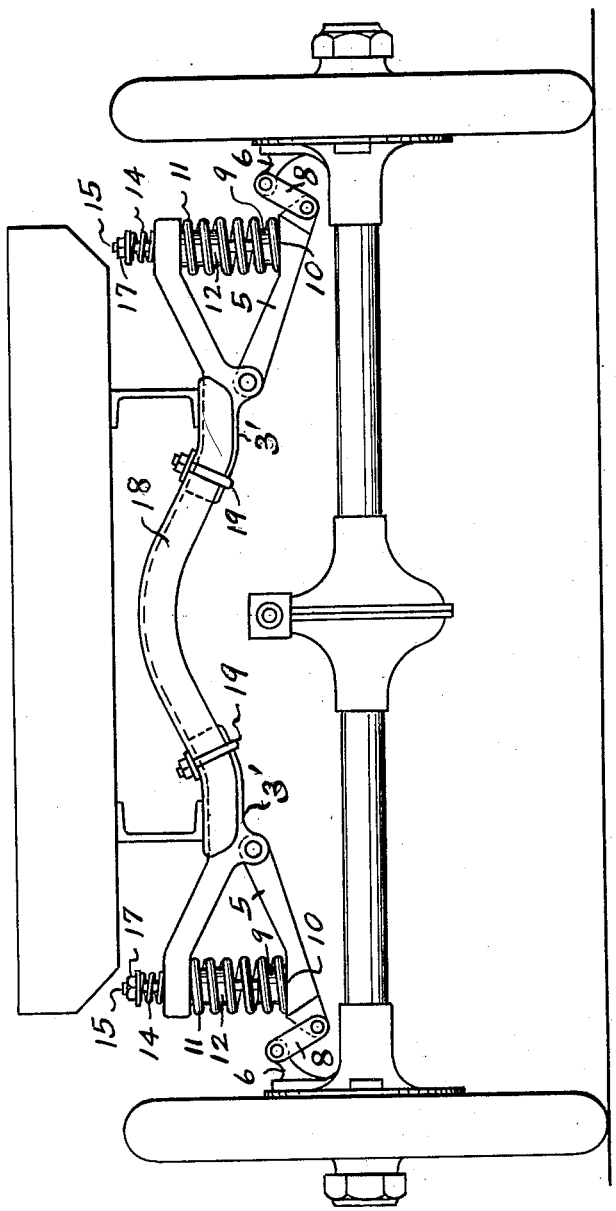

Patented Dec. 17, 1929

1,739,917

UNITED STATES PATENT OFFICE

SAMUEL B. RAYZOR, OF HOUSTON, TEXAS

COMBINATION VEHICLE SPRING AND SNUBBER

Application filed August 24, 1926. Serial No. 131,154.

This invention relates to new and useful improvements in a combination vehicle spring and snubber.

One object of the invention is to provide a device of the character described adapted to be mounted on a front or rear vehicle axle, and to support the vehicle body thereon. The design of spring and snubber shown is particularly applicable to Ford automobiles and trucks, but the device may be applied to other types of vehicles.

Another object of the invention is to provide a device of the character described designed to support the vehicle body yieldingly on the axles and to take the place of the conventional type of springs now commonly used.

A further object of the invention is to provide a combined spring and snubber which will not only absorb the shock incident to the vehicle movements and thus lessen the ordinary jar and vibration but will also check or snub the rebound, as well as reduce the side swinging of the body to a minimum.

Finally an object of the invention is to provide a combination spring and snubber for vehicles which will be of neat and artistic appearance, which may be cheaply and easily produced and which is very efficient for the purpose intended.

With the above and other objects in view this invention has particular relation to certain novel features of construction, operation and arrangement of parts, an example of which is given in this specification, and illustrated in the accompanying drawings, wherein:—

Figure 3 shows a fragmentary rear view of a motor vehicle showing a modified form of the device.

Figure 1:
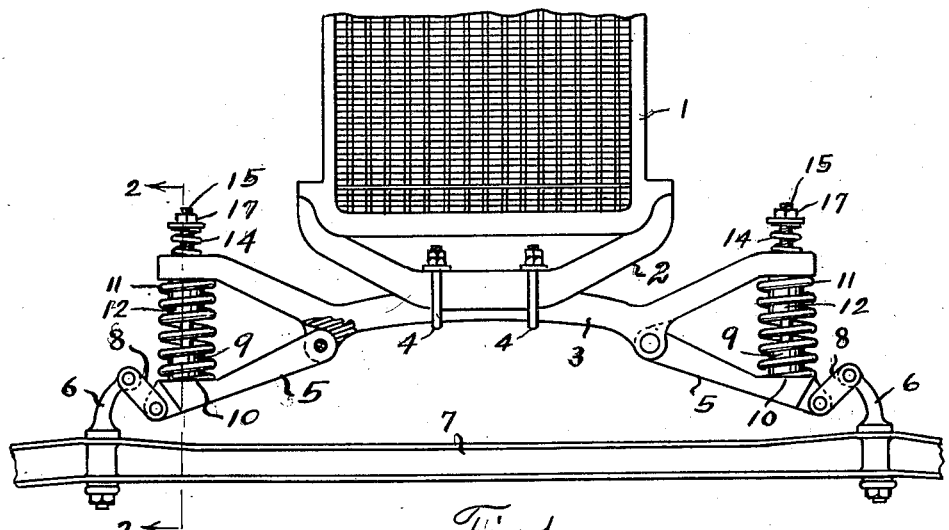
Figure 1 shows a fragmentary front elevation of a motor vehicle embodying the spring and snubber.
Figure 2:
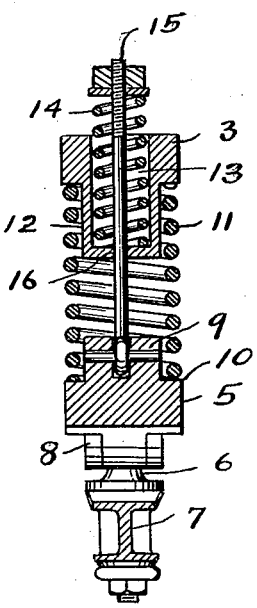
Figure 2 shows a vertical sectional view taken on the line 2—2 of Figure 1.

Referring now more particularly to the drawings, wherein like numerals of reference designate similar parts in each of the figures the numeral 1 designates the vehicle radiator and beneath it is the arcuate downwardly curved cross yoke 2, forming the front part of the vehicle frame. This yoke 2 is supported on the cross bar 3 to which it is secured by the clamps 4. Links 5, 5, are provided whose outer ends are swung from the usual perches 6, 6, of the vehicle axle 7, by means of the shackles 8, and the inner ends of said links are pivotally connected to the bar 3, one on each side of the center thereof. The outer ends of the links 5 are formed with upstanding bosses 9, 9, surrounding which are the seats 10, 10, adapted to support the coil load springs 11, 11, whose lower ends receive said bosses.

The free ends of the bar 3 rest on the springs 11, and have the depending bosses 12, 12, which fit into the upper ends of said springs, said bosses 9 and 12 serving to hold the springs 11 against displacement.

The ends of said bar have the sockets 13, 13, which extend down into the bosses 12 and are provided to receive the check or snubber springs 14, 14.

There are the anchor rods 15, 15, whose lower ends are connected to the corresponding bosses 9 and they extend up through the corresponding springs 11 and 14 as well as through the bearings 16, 16, of the bosses 12 and the upper ends of said rods are threaded to receive the adjustable retaining nuts 17 which are threaded thereon.

The load springs 11 are considerably stronger than the snubber springs 14 and sustain the load of the body and receive the downward thrusts incident to the movements of the vehicle over rough roads and absorb or break the shock thereof, while the snubber springs 14 check, or snub, the rebound.

The compression on both the springs 11 and 14 may be varied by the adjustment of the nuts 17.

As illustrated in Figure 1 of the drawings the device is shown applied to support the front end of the vehicle body. The same form of the device may be utilized to support the rear end of the body of the ordinary passenger vehicle, only a slight change in the contour of the cross bar 3 being necessary to conform it to that portion of the rear end of the frame to which it is attached.

In Figure 3 there is shown the rear end of a truck showing the body supported on the rear axle by a slightly modified form of the device wherein the rear cross yoke 18, forming the rear part of the vehicle frame constitutes the central section of the supporting bar and the ends 3' are anchored to the cross yoke 18 by means of the conventional clamps 19. In other respects this modified form is similar, in principle, and mode of operation to that shown in the other figures.

What I claim is:

A device of the character described including a supporting cross bar whose ends diverge from the longitudinal axis of the bar and are free, bosses having deep sockets, one depending from each free end of said bar, rigid links pivoted at their inner ends, one on each side of the center of said bar and whose outer ends are disposed underneath said respective bosses, each link and the corresponding end of said bar, diverging, at substantially equal angles, from said axis, coil springs seated on the outer ends of said links and on which the outer ends of the cross bar are seated, said bosses being surrounded by the corresponding springs, a rod fixed to the outer end of each link and extending up through the corresponding springs and bosses an abutment carried by the upper end of each rod, spring seated in said sockets whose upper ends abut against said respective abutments.

In testimony whereof I have signed my name to this specification.

SAMUEL B. RAYZOR.